Oct. 14, 1969   H. MASHEDER   3,472,270
BALL VALVES

Filed Oct. 30, 1967   4 Sheets-Sheet 1

INVENTOR
HENRY MASHEDER

Attys.

Oct. 14, 1969  H. MASHEDER  3,472,270
BALL VALVES

Filed Oct. 30, 1967  4 Sheets-Sheet 3

INVENTOR

HENRY MASHEDER

United States Patent Office 3,472,270
Patented Oct. 14, 1969

3,472,270
BALL VALVES
Henry Masheder, London, England, assignor to Masheder Design Studies Limited, London, England
Filed Oct. 30, 1967, Ser. No. 679,056
Claims priority, application Great Britain, Apr. 14, 1967, 17,215/67
Int. Cl. F16k 5/06
U.S. Cl. 137—315        11 Claims

ABSTRACT OF THE DISCLOSURE

A universal ball valve in which the valve is insertable into operative position between retractable seats in a valve body through an aperture in the wall of that body which is closed by an axially slidable external sleeve, the valve is supported between a pair of diametrically opposite trunnions which can be drawn clear of the valve bore and one of which constitutes an operating spindle.

---

This invention concerns improvements in ball valves for gas pipe line systems and general industrial use.

It is the object of the invention to provide universal ball valves, that is valves having part spherical obturators provided with a through bore which may be turned to coincide with or lie transverse to the valve passage, of generally standard construction for use throughout the whole range of size, pressure and temperature encountered in industry.

According to the invention from one aspect I provide a universal ball valve wherein the obturator is carried in the valve casing by a pair of diametrically opposite axially removable trunnions, the casing is provided with at least one aperture for insertion of the obturator and the said aperture is sealed by an axially slidable sleeve fitted around the valve body.

According to the invention from another aspect I provide a universal ball valve having an obturator insertable through an aperture in the valve body transversely to a pair of axially removable trunnions upon which it is mounted, an axially slidable sleeve fitted around the valve body to seal the said aperture and a pair of axially displaceable valve seating rings sealed within the valve passage movable between a withdrawn position which permits insertion of the obturator and an operative position in which they form seals with the surface of the obturator around a through bore therein.

The preferred outer cross-section of the valve body and sleeve is cylindrical, but hexagonal or other shapes could be used.

One of the trunnions upon which the obturator is mounted is splined, squared or otherwise keyed to a recess in the obturator and acts as an operating stem by which it is turned between open and shut positions.

The axially slidable sleeve may be sealed to the valve body by resilient O-rings, or by any conventional type of packing rings or spiral metal sealing rings compressed against an external shoulder of the body by screwed or bolted gland rings. Alternatively it may be seal welded to the valve body or its connection flanges.

The valve seating rings operate within annular recesses formed in the valve passage at either side of the obturator and may be sealed to the wall of the passage by circumferential resilient O-rings or axially compressible metallic or other bellows type seals. The seating rings may incorporate subsidiary rings of toughened plastics material or soft or hardened metal to make actual contact with the surface of the obturator.

In the smaller sizes of valve it may be convenient to make one supporting trunnion in one piece with the operating spindle and to provide a gland within the sleeve; in other cases it is preferable to divide the trunnion from the operating spindle and to provide a squared socket or dog clutch type of connection between the supporting trunnion and the actual operating part.

It is an important feature of the invention that the obturator is fully supported against axial thrust from the pressure fluid being controlled by its trunnions; and it is a further important feature that the valve seating rings are subjected to line pressure on their outer faces and are thereby forced into firm sealing contact with the surface of the obturator.

A further important feature of the invention is that once the obturator has been installed and is subject to line pressure it is possible to slide back the aperture-covering sleeve on the valve body and to inspect the valve for tightness whether in the open or closed position.

The operation will involve the temporary removal of the seal weld of the sleeve but does not necessitate isolation of the line in which the valve is fitted. After isolation of the line it is a simple matter to replace any damaged seal or seating ring or even the obturator itself.

The above and other features of the invention are embodied in the following description of alternative constructional forms of universal ball valve of diverse size and duty, with reference to the accompanying drawings in which.

Figure 1:
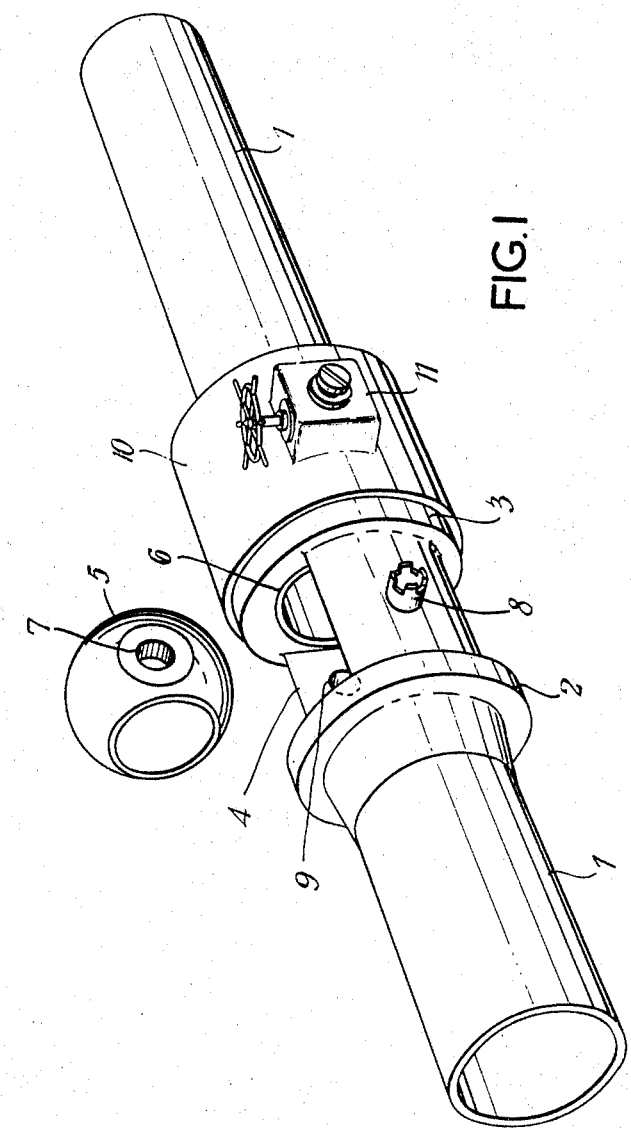
FIG. 1 is a partially exploded perspective view of a typical universal ball valve showing how the obturator and valve seats can be inserted or removed.

Referring first to FIG. 1 a valve in accordance with the invention is shown in partially dismantled condition.

A pipeline 1 is welded to inlet and outlet flanges 2 and 3 of the valve body 4.

A large aperture, greater in width than the valve seat diameter is provided in the upper part of the valve body for the insertion or removal of the ball obturator 5 and of valve seats such as 6.

The obturator 5 has an internally splined aperture 7 in one side and a similar plain circular aperture (not shown) in the diametrically opposite side.

An externally splined trunnion 8 is shown partially withdrawn from an aperture in the valve body 4, this trunnion has dog teeth on its outer face for engagement by a valve operator.

A plain circular trunnion (not shown) is fitted in an aperture 9 in the valve body 4.

A slidable sleeve 10 is shown drawn back from the large aperture in the top of the valve body 4 over the outlet flange 3, and this sleeve carries the valve operator indicated at 11.

It will be seen that valve seats such as 6 may be inserted through the large aperture in the valve body to take up positions in annular seat housing (not shown)

on upstream and downstream sides of the valve proper with a permitted degree of axial movement (possibly spring-resisted).

With the valve seats pushed back into their housings it is possible to lower the ball obturator 5 into position between them with the splined hole 7 (and unshown plain hole) aligned with the trunnion 8.

The splined trunnion 8 (and its opposite plain circular trunnion) may now be pressed home to support the obturator in position, the sleeve 10 is then slid (to the left in the drawing) to bridge the space between flanges 2 and 3 and the valve operator 11 is engaged with the dog teeth of trunnion 8.

Figure 2:
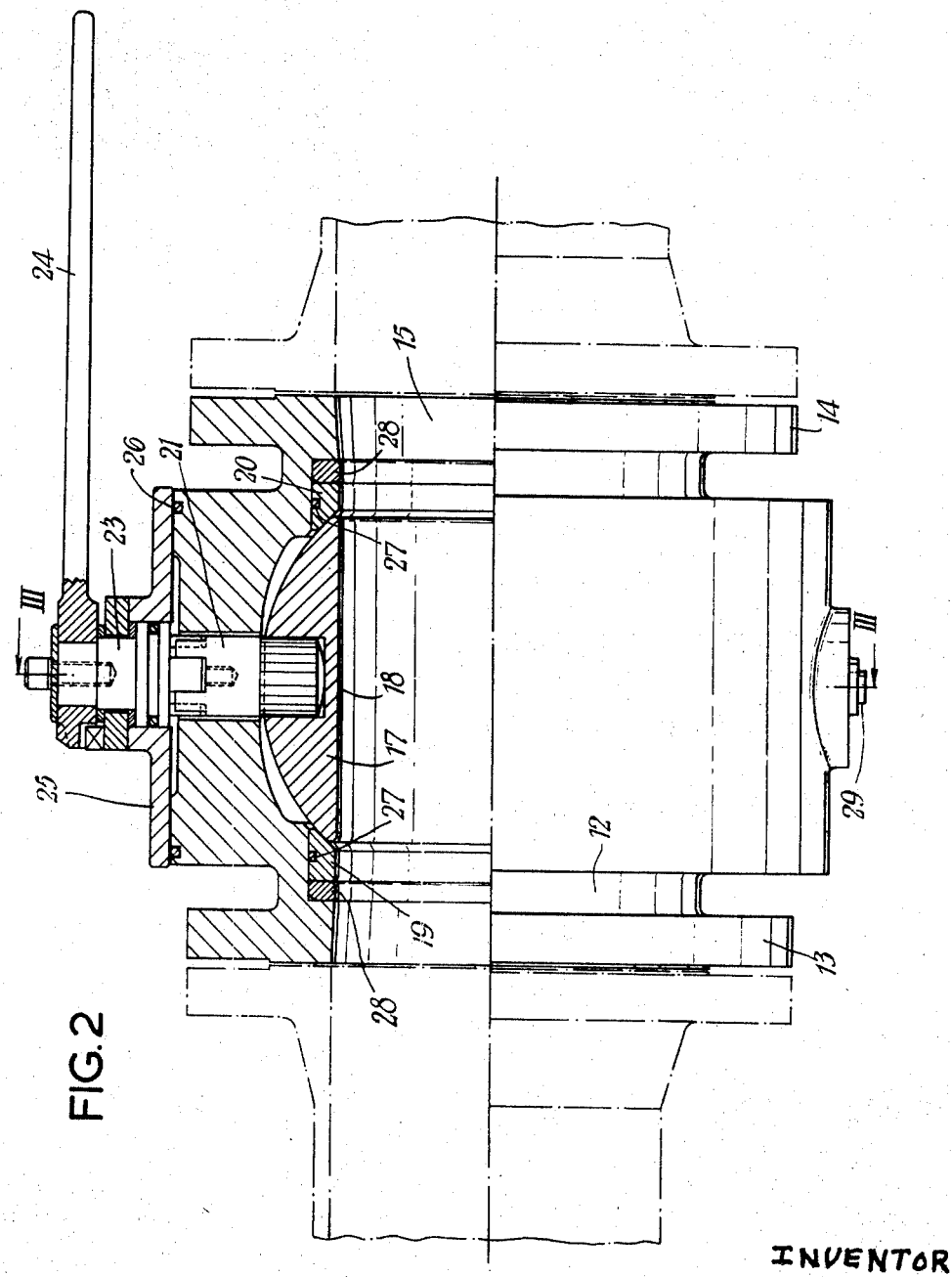
FIG. 2 is a side elevation with the upper part in central vertical section of one preferred form of valve in the open position.

Referring next to FIG. 2, a valve of from, say, 1" to 6" bore designed for a medium pressure application of up to about 300 p.s.i. at low temperature has a generally cylindrical body 12 incorporating inlet and outlet connection flanges 13 and 14.

The body provides a through passage 15 between the flanges at least as great in diameter as that of the pipeline in which it is to be fitted.

Figure 3:
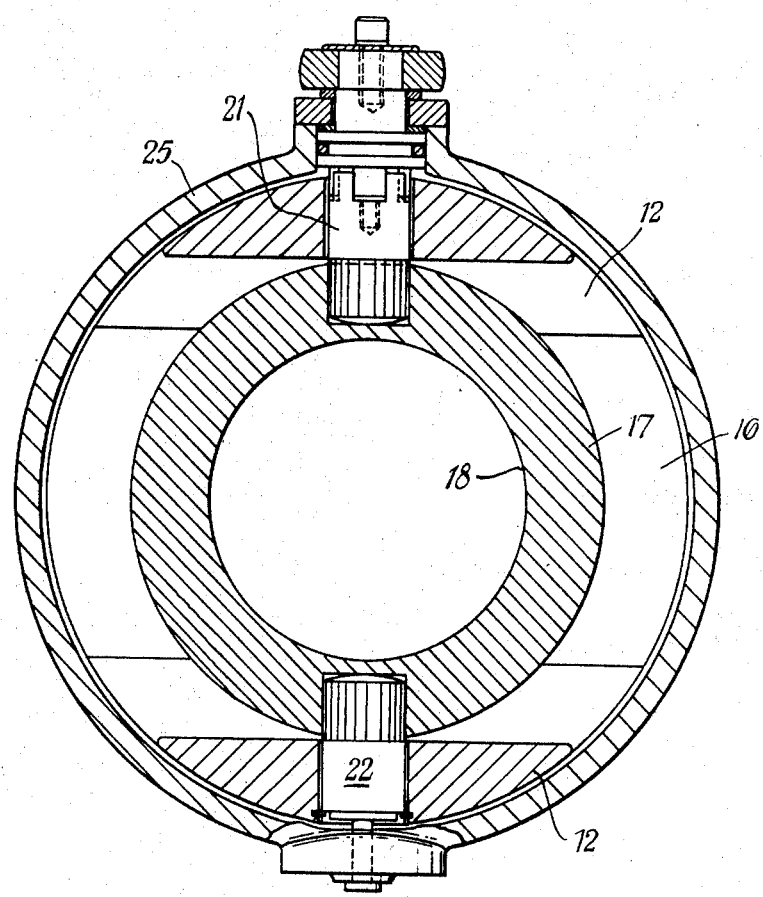
FIG. 3 is a cross-section on the line III—III of FIG. 1 showing the valve body, obturator, trunions and sleeve.

An aperture 16 (FIG. 3) in the side of the body 12 permits the insertion into the valve passage of a part sperical obturator 17 having a through bore 18 equal in diameter to the pipe line.

The aperture also permits the insertion of a pair of valve seating rings 19 and 20 into annular recesses formed in the upstream and downstream portions of the valve passage wall on either side of the obturator location. In practice these seating rings are fitted into position before insertion of the obturator and are pushed back axially into the recesses to permit such insertion.

The obturator is mounted upon a pair of trunnions 21 and 22 located on diametrically opposite sides of the valve body. These trunnions are temporarily withdrawn into bored holes in the valve body to permit insertion of the obturator and are then moved forward to engage recesses provided in that obturator.

The trunnion 21 is squared, keyed or splined so as to constitute an operating spindle by which the obturator can be turned through a right angle from open to shut position. This trunnion is attached either directly or through an intermediate stem 23 to an operating handle 24.

A neatly fitting axially slidable sleeve 25 is fitted around the central portion of valve body, and this sleeve is slid into position to cover the aperture therein after insertion of the valve seating rings 19 and 20 and obturator 17. It is sealed to the outer surface of the valve body by O-rings 26 housed in grooves therein.

The valve seating rings are each provided with a groove which houses an O-ring 27 forming a seal with the outer wall of the recess in which it is axially movable. A porous elastomer cushion ring 28 is fitted behind each seating ring.

A suitable gland is provided between the sleeve 25 and the operating stem 23 connected to the operating trunnion and a plug 29 is fitted behind the other trunnion to keep it in engagement with the obturator 17.

In service the pressure in the pipe line in which the valve is fitted acting upon the outer faces of the seating rings presses them into firm sealing engagement with the surface of the obturator.

Figure 4:
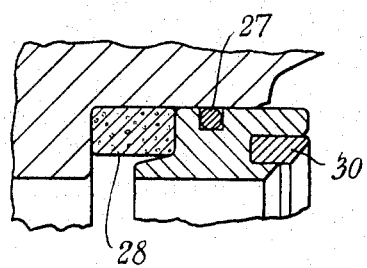
FIG. 4 is a scrap section showing a typical low temperature, low pressure valve seating arrangement.

As shown in FIG. 4, the seating rings 19 and 20 may be fitted with a plastic or like resilient ring 30 to contact the face of the obturator.

Figure 5:
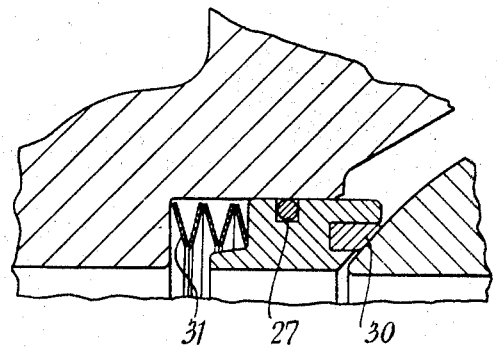
FIG. 5 is a similar view to FIG. 4 showing an alternative valve seating arrangement.

In an alternative construction shown in FIG. 5 spring plates 31 can be fitted which are accessible when the sleeve is withdrawn, to exert a uniform pressure on the seating ring making it engage and seal on the surface of the obturator even when the pressure of the fluid is low or absent altogether.

A larger valve of, say, 20" bore designed for high temperature operation is of generally similar construction to that above described, but sealing materials suitable to the valve's duty are employed.

Figure 7:
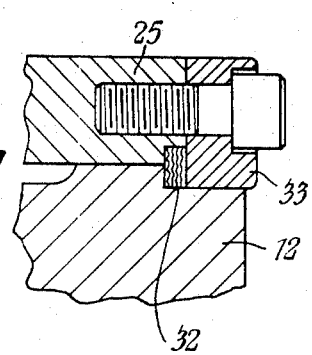
FIG. 7 is a scrap section showing a joint between valve body and sleeve suitable for high temperature high pressure duty.
Figure 8:
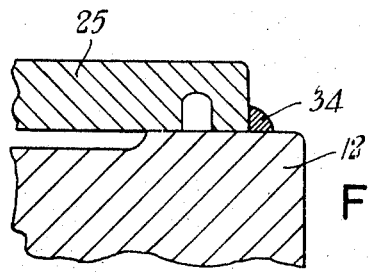
FIG. 8 is a scrap section showing a welded joint between valve body and sleeve.

For example a spiral metal packing 32 (FIG. 7) compressed onto an external shoulder of the body by a gland ring 33 may take the place of the resilient O-rings 26 as a seal between the sleeve and the valve body. Alternatively a seal weld 34 (FIG. 8) may be made between sleeve and body and such weld may be ground, machined or burnt away when it is desired to shift the sleeve for inspection purposes.

Figure 6:
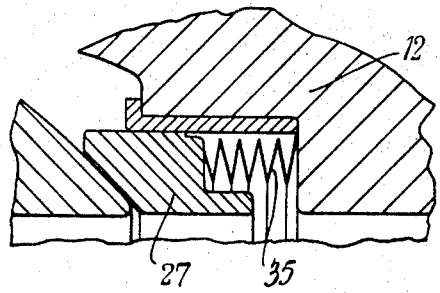
FIG. 6 is a scrap section showing a valve seating arrangement suitable for high temperature operation.

Similarly metal expansion bellows 35 (FIG. 6) may replace the resilient O-ring and elastomer cushion used in low temperature valves to form a seal between the valve seating rings and the recesses within which they slide.

Also the seating rings may be of all metal construction and be provided with a conical face (FIG. 6) making direct contact with the surface of the obturator.

Electric, hydraulic or mechanical operators may be required for the rapid movement of such large valves between open and shut positions.

It will be understood that the invention is not restricted to the details of the specific embodiment described which may be varied without departing from the scope of the following claims.

I claim:
1. A universal ball valve comprising, in combination,
  a valve casing having a main body portion provided with an axial bore therethrough, said main body portion having a lateral opening intersecting said bore and presenting a trough,
  a ball valve received in said trough,
  trunnion means pivotally connecting said ball valve to the opposite sides of said trough about an axis normal to the axis of said bore, said ball valve having a bore therethrough which may be aligned with said bore through said casing,
  a sleeve axially slidable on said casing to expose and cover said lateral opening selectively,
  and means carried by said sleeve for rotating said ball valve within said casing.

2. The ball valve according to claim 1 wherein said trunnion means comprises a pair of pins rotatably received in the opposite sides of said trough, said opposite sides of the trough being provided with through openings slidably receiving said pins.

3. The ball valve according to claim 2 wherein one of said pins is keyed to said ball valve, and the last means including a retractable pin keyed to said one pin.

4. The ball valve according to claim 1 including a pair of seating rings at the opposite ends of said trough and engaging said ball valve.

5. A universal ball valve according to claim 4 in which the seating rings are urged into sealing engagement with the ball valves by resilient means interposed between themselves and the valve body.

6. A universal ball valve according to claim 4 in which the seating rings are subjected to line pressure to urge them into sealing engagement with the ball valve.

7. A universal ball valve according to claim 4 in which the seating rings incorporate resilient sealing rings to maintain sealing contact with at least the valve body.

8. A universal ball valve according to claim 4 in which the seating rings are of all metal construction and have frusto-conical faces for engagement with the ball valve.

9. A universal ball valve according to claim 1 in which the axially slidable sleeve is sealed to the valve body by compressible resilient rings.

10. A universal ball valve according to claim 1 in which the axially slidable sleeve is sealed to the valve body by spiral metal rings compressed against shoulders formed in the body by gland rings.

11. A universal ball valve according to claim 1 in which the slidable sleeve is sealed to the body by a seal weld.

(References on following page)

References Cited

UNITED STATES PATENTS

| | | | | |
|---|---|---|---|---|
| Re. 25,471 | 11/1963 | Fredd | 251—315 | XR |
| 2,837,308 | 6/1958 | Shand | 251—315 | XR |
| 2,890,017 | 6/1959 | Shafer | 251—367 | XR |
| 2,894,715 | 7/1959 | Bostock | 251—315 | XR |
| 3,132,837 | 5/1964 | Britton | 251—315 | XR |
| 3,348,804 | 10/1967 | Piccardo | 251—367 | XR |

HAROLD W. WEAKLEY, Primary Examiner

U.S. Cl. X.R.

251—172, 174, 315, 367